US006944333B2

(12) United States Patent
Douglass

(10) Patent No.: US 6,944,333 B2
(45) Date of Patent: Sep. 13, 2005

(54) COLOR IMAGE COMPRESSION VIA SPECTRAL DECORRELATION AND ELIMINATION OF SPATIAL REDUNDANCY

(75) Inventor: James Douglass, Indialantic, FL (US)

(73) Assignee: Ventana Medical Systems, Inc., Tuscon, AZ (US)

( * ) Notice: Subject to any disclaimer, the term of this patent is extended or adjusted under 35 U.S.C. 154(b) by 166 days.

(21) Appl. No.: 10/427,342

(22) Filed: Apr. 30, 2003

(65) Prior Publication Data

US 2004/0218812 A1 Nov. 4, 2004

(51) Int. Cl.$^7$ .................................................. G06K 9/36
(52) U.S. Cl. ........................ 382/166; 382/241; 382/248; 382/249; 341/59
(58) Field of Search ................................. 382/166, 235, 382/241, 243, 245, 248, 249; 341/59, 65, 67

(56) References Cited

U.S. PATENT DOCUMENTS

| | | | | | |
|---|---|---|---|---|---|
| 4,926,247 | A | * | 5/1990 | Nagasaki et al. | 348/262 |
| 5,220,620 | A | * | 6/1993 | Nakano et al. | 382/167 |
| 5,377,024 | A | * | 12/1994 | Dillinger | 358/502 |
| 5,835,099 | A | * | 11/1998 | Marimont | 345/591 |
| 6,151,405 | A | | 11/2000 | Douglass et al. | 382/133 |
| 6,215,892 | B1 | | 4/2001 | Douglass et al. | 382/128 |
| 6,553,135 | B1 | | 4/2003 | Ring et al. | 382/128 |
| 6,577,754 | B2 | | 6/2003 | Stone et al. | 382/133 |
| 6,687,411 | B1 | * | 2/2004 | Miura et al. | 382/250 |

OTHER PUBLICATIONS

MacAulay et al., "*Adaptive Color Basis Transformation* An Aid in Image Segmentation", The International Academy of Cytology, Analytical and Quantitative Cytology and Histology, vol. 11 No. 1, pp. 53–58 (Feb. 1989).

Scott E. Umbaugh, et al., "*Automatic Color Segmentation of Images with Application to Detection of Variegated Coloring in Skin Tumors*". IEEE Engineering in Medicine and Biology Magazine, pp. 43–52, (Dec. 1989).

Jean–loup Gaily, comp.compression Frequently Asked Questions (part 1/3), (Sep. 5, 1999).

Jean–loup Gaily, comp.compression Frequently Asked Questions (part 2/3), Section 75, "Introduction to JPEG" (Sep. 5, 1999).

* cited by examiner

*Primary Examiner*—Bhavesh M. Mehta
*Assistant Examiner*—Yosef Kassa
(74) *Attorney, Agent, or Firm*—McDonnell Boehnen Hulbert & Berghoff LLP

(57) ABSTRACT

A method of compressing a color image is provided. The color image comprises color data for a plurality of pixels. The method includes the step of obtaining red, green and blue pixel values of an object of interest in the image. A calculation is made of the complement of the red, green and blue values of the object of interest. Transformation coefficients are calculated which transform the complements of red, green and blue values of the object of interest into representations in a transformation color space. The transformation coefficients are applied to all the pixels in the image to thereby obtain a transformed data set representing the image having components along three mutually orthogonal axes (A, B and C herein) in a three-dimensional transformed color space. The transformed data set is scaled in accordance with the color quantization used in the system; e.g., the A, B and C values are between 0 and 255 for an 8 bit quantization. A compression algorithm, e.g., a loss less algorithm such as WINZip or LZW is applied to at least two components of the transformed data set to thereby produce output data representing a compression of the image.

46 Claims, 11 Drawing Sheets

(4 of 11 Drawing Sheet(s) Filed in Color)

RED PLANE

GREEN PLANE

BLUE PLANE

GREEN VS RED SCATTER PLOT

BLUE VS RED SCATTER PLOT

BLUE VS GREEN SCATTER PLOT

TRANSLATED GREEN VS RED SCATTER PLOT

TRANSLATED BLUE VS RED SCATTER PLOT

TRANSLATED BLUE VS GREEN SCATTER PLOT

TRANSLATED GREEN VS RED SCATTER PLOT

TRANSLATED BLUE VS RED SCATTER PLOT

TRANSLATED BLUE VS GREEN SCATTER PLOT

A IMAGE

B IMAGE

C IMAGE

ORIGINAL IMAGE
955 kB

CASE 1 (LOSS LESS)
631 kB

CASE 2
405 kB

CASE 3
316 kB

CASE 4
176 kB

CASE 5
143 kB

STEP 1
ROTATION THROUGH θ

STEP 2
ROTATION THROUGH φ

STEP 3
COPLANAR ROTATION THROUGH α

COLOR IMAGE COMPRESSION VIA SPECTRAL DECORRELATION AND ELIMINATION OF SPATIAL REDUNDANCY

BACKGROUND

1. Field of the Invention

This invention relates generally to the field of techniques for compressing still images containing color information. The invention is particularly suited for use in compression of images having objects of interest in one color and background objects either clear or of another contrasting color. An example of such images are images of cellular specimens, such as, for example, digital color images of a tissue sample obtained from a microscope equipped with a color camera, in which the sample is stained with one or more stains to highlight cellular structure, cellular objects, or other features such as positive objects, proteins, etc. However, the invention is applicable to compression of other types of images.

2. Description of Related Art

The basis for many data compression methods used today is the reduction, removal, or exploitation of statistical redundancy in the image. Image data is often highly spatially redundant. In particular, a given picture element or pixel is often partially correlated with its neighbor(s). For example, if an image has a significant amount of blank areas, any given pixel in the blank area is likely to have the same value or intensity as an adjacent pixel. Some popular image compression methods, whether lossy or loss less, work to exploit this redundancy to achieve compression.

Loss less dictionary based compression methods and substitution compression methods (e.g. LZW, WINZip) assign a "symbol" to each data value, or sequence of values. This symbol is transmitted or stored instead of the original data. Statistical redundancy in the original data results in this symbol being shorter, i.e. requires fewer bits, than the original data sequence, thereby resulting in compression. Statistical, or entropy coders (Shannon-Fano, Huffman, or Arithmetic) work similarly. These methods assign a relatively short binary sequence to the most frequently occurring data value or string, and longer sequences to those occurring less frequently which can result in compression when the original data contains redundancy. Predictive compression methods, e.g. Differential Pulse Code Modulation (DPCM) predict the value of a given sample based on the redundancy of previous data values and code the difference (only) thereby reducing redundancy. Transform compression methods Discrete Cosine Transform (DCT), Fourier, Wavelet, or other) achieve compression partly by reducing the coding precision of the transform coefficients but also by entropy coding. Lossy baseline JPEG compression works in this way, while loss less JPEG utilizes a mix of DPCM and entropy coding.

Color imagery is often compressed without regard to redundancy between red, green and blue color channels. For instance, in lossy baseline JPEG compression of 3-band color images, the initial red, green, and blue planes are transformed into a color space such as Hue, Saturation, and Intensity. The Hue and Saturation planes are down-sampled to reduce the total amount of data. These planes are subsequently up-sampled upon reconstruction making use of the reduced chrominance resolution capability of human color vision, without regard to spectral redundancy.

In the biology fields, including cytology, histology, and pathology, digital images of tissue and cellular objects are typically obtained from a microscope equipped with a color camera which records red, green, and blue planes for these images. Frequently, the objects in the specimen can fall into two general types: normal cells and abnormal cells. The images typically include clear areas of background, representing inter-cellular spaces. It is also common practice to apply one or more stains to the specimen on the slide so that the objects of interest have a contrasting color from background objects or objects of less interest so that they are more readily identified and observed. For example, normal cells are often stained (or, counterstained as is usually said) with a stain such Hematoxylin and appear light blue, while abnormal cells (i.e. positive cells) are stained with a different stain, such as 3-amino 9-ethylcarbazol (AEC) so that the abnormal cells have a different color, e.g. reddish brown. Other color combinations are possible.

The present invention provides methods and apparatus for compression of color images with little or no loss of useful image information. Techniques for compression of digital images without significant loss of image information, such as provided with this invention, are useful to the art because they reduce the bandwidth requirements for transmission of such images over computer networks, thereby allowing such images, or groups of images, to be sent quickly from one location to another.

SUMMARY

A method of compressing a color image is provided. The color image comprises color data for a plurality of pixels. The method includes the step of obtaining red, green and blue pixel values of an object of interest in the image. In an alternative embodiment, red green and blue pixel values for both an object of interest, such as a "positive" cell, and a background object, such as a normal cell, is obtained. A calculation is made of the complement of the red, green and blue values of the object of interest, and where present, the background object. Transformation coefficients are calculated which transform the complements of red, green and blue values of into representations in a three-dimensional transformation color space. The transformation coefficients are applied to all the pixels in the image to thereby obtain a transformed data set representing the image having components along three mutually orthogonal axes (A, B and C herein) in the three-dimensional transformation color space. The transformed data set is scaled in accordance with the color quantization used in the system; e.g., the A, B and C values are scaled and integerized to be between 0 and 255 for an 8 bit quantization system. A compression algorithm, e.g., a loss less algorithm such as WINZip or LZW, is applied to at least two components of the transformed data set to thereby produce output data representing a compression of the image. Numerous types of additional lossy compression techniques could be performed either before or after the loss less compression is performed.

In another aspect, a method for compressing an image composed of a plurality of pixels having at an object is provided. The method comprises the steps of:

a) receiving the image, the image including color data for pixels representing the object; the color data for the pixels representing the object having an approximately linear form if plotted as a function of red, green and blue color components of the color data;

b) calculating new color values for the pixels based on the coordinates of the pixels in a three-dimensional transformation color space, the color space having an axis coinciding, at least approximately, to the approximately linear form of the plotted color data; and c) performing a compression process on the new color values to thereby produce output image data in which spatial redundancy in the image is eliminated or reduced based on the new color values for the pixels in the transformation color space.

In illustrated embodiments, the methods of the invention are coded in computer software that may be executed in a general-purpose computer. The computer may be a stand-alone device, or alternatively incorporated into some other device, such as a computer controlled microscope or other source of the image.

This invention is based on the discovery that, for many types of images, particularly those of biological specimens, redundancy exists between the three spectral channels of images that have contrasting colors for objects of interest and background objects. The invention provides for apparatus and methods for removing this redundancy. These methods may be most readily understood by disregarding the usual view that each component of the color image, i.e., the red, green, and blue components of a given pixel, represents a color. Instead, color values for a given pixel are viewed as numerical coordinates in a three-dimensional space (referred to herein as a "color cube") formed by the red, green, and blue coordinates. The red, green and blue colors can be thought of as corresponding to the X, Y and Z orthogonal axes of a three axis Cartesian coordinate system. A suitable translation and rotation of this coordinate system, described in detail herein, results in three new color axes which no longer are pure colors, but rather are linear combinations of the original three. The resulting coordinate system produces three new orthogonal color axes (the A, B and C axes herein) that are less correlated between themselves, but now contain considerably higher spatial redundancy between adjacent pixels. The values of the pixels in the new three dimensional transformation color space coordinate system yields three new color planes or color images. A loss less compression of these three new planes, such as by statistical, substitution or other methods, removes this spatial redundancy, resulting in an overall loss less compression of the color imagery.

Greater compression may also be achieved by down-sampling, thresholding, or even elimination of one of these new planes resulting in data loss, strictly speaking, but extremely little loss of useful image information. In some instances, the "loss" is in the clear background of the original image resulting in negligible reduction of image utility.

BRIEF DESCRIPTION OF THE DRAWINGS

The patent or application file contains at least one drawing executed in color. Copies of this patent or patent application publication with color drawing(s) will be provided by the Patent and Trademark Office upon request and the payment of the necessary fee.

FIGS. 7A–7D show the nearly linear band of points for both the counterstained object and the positive object.

DETAILED DESCRIPTION OF PREFERRED EMBODIMENTS

Overview

Before describing the presently preferred compression technique in detail, a demonstration will be provided first showing that 3-band color images can be spectrally decorrelated to produce spatially redundant images. The spatial redundancy is removed through loss less compression methods. The following description will provide a conceptual understanding to the color space transformation aspects of this invention and how the spectral de-correlation features can be used to produce a new representation of the image data that provides a basis for either loss less or lossy compression techniques. This conceptual understanding will also aid in understanding of how the invention can be embodied as a series of software instructions stored in a machine-readable storage medium, and executed by a general-purpose computer.

Figure 1:
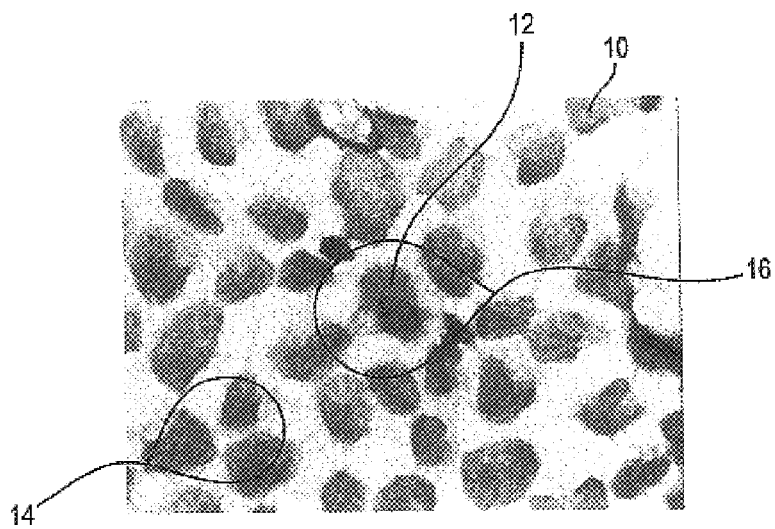
FIG. 1 is a color image of a tissue sample taken with a microscope equipped with a color camera, showing normal cells, counterstained to have a light blue appearance, and a positive cell in roughly the center of the image that is stained to have a reddish appearance. The present invention provides for methods for compressing an image such as the image of FIG. 1.

FIG. 1 shows a typical color microscope image of a tissue sample showing a collection of cells. The blue stained cells 10 are "normal" while the cell 12 in the middle is "abnormal" or "positive" in such a way that it is preferentially stained a reddish color. For example, the "positive" object may be a cell having characteristics associated with some particular disease or condition, such as cancer. The bluish and reddish colors are obtained by staining the tissue sample with one or more stains, the details of which are known in the art.

Figure 2A:
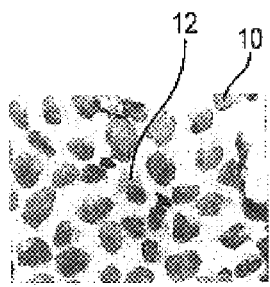
FIGS. 2A–2C are the red, green and blue components of the image of FIG. 1.
Figure 2B:
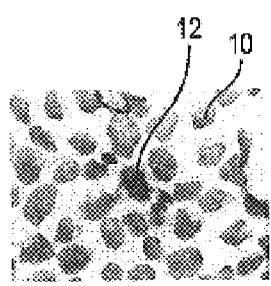
Figure 2C:
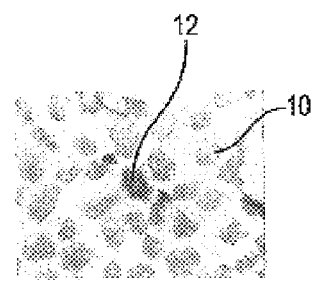

FIGS. 2A, 2B and 2C show the individual red, green, and blue images or planes, respectively, that together form the color image of FIG. 1. Note that the counterstained cells 10, those that are light blue in the original image, are relatively dark compared to the clear background in each of these three images. This alone says that there is a correlation, between the three channels—i.e. what one "does" the others "do" too.

Figure 3A:
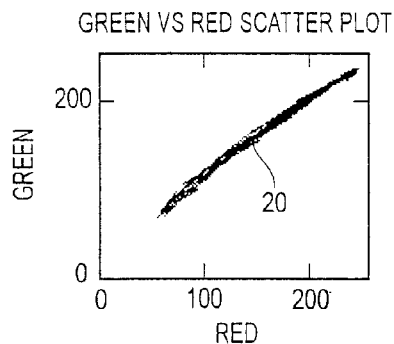
FIGS. 3A–3C are two-dimensional color plots for a portion of the image of FIG. 1 containing blue counterstained objects and clear background, wherein the color value of a given pixel is plotted as a function of its color for two colors.
Figure 3B:
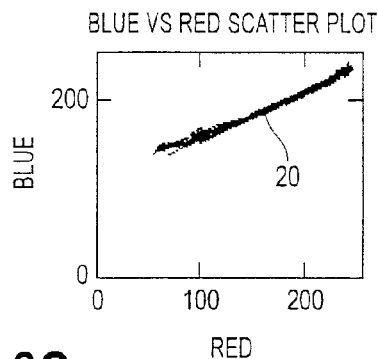
Figure 3C:
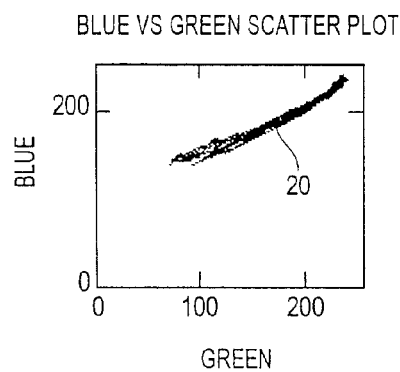

This correlation may be observed more clearly in FIGS. 3A, 3B and 3C, which are scatter plots from a small section of the color image of FIG. 1, taken from an area 14 in the lower left hand of FIG. 1 containing only counterstained cell pixels and clear background. In FIGS. 3A–3C, a given pixel is plotted as a point whose position is determined by its color values. For instance, in the Green vs. Red scatter plot of FIG. 3A, each pixel is plotted as a point utilizing its red value as its "x" coordinate, and its green value as its "y" coordinate. By plotting a number of such points (several hundred in this case) the observed bands of pixels result. The other scatter plots of FIGS. 3B and 3C are constructed similarly, with FIG. 3B showing the red value as the "x" coordinate and its blue value as its "y" coordinate, and in FIG. 3C the green value is the "x" coordinate and the blue value is the "y" coordinate.

What FIGS. 3A–3C show is that the red, green, and blue color components of the counterstained objects (blue objects in the color image of FIG. 1) are highly correlated. This is indicated by the points in the plots falling, more or less, on a straight line in each of the three plots. Considering FIG. 3A, if one knew the red value for a given color pixel, one could calculate its green value using the (nearly) linear relationship shown, without having to store or transmit the additional values. The other plots illustrate the same result, namely that given any one color component, the other two could be reconstructed. The linear relationship shown in FIG. 3A–3C may not be present in every color image, for example where there is a wide variety of different hues and the objects of interest are of different colors. The linear relationship shown in FIGS. 3A–3C is not necessarily limited to biological specimens, either.

Figure 4A:
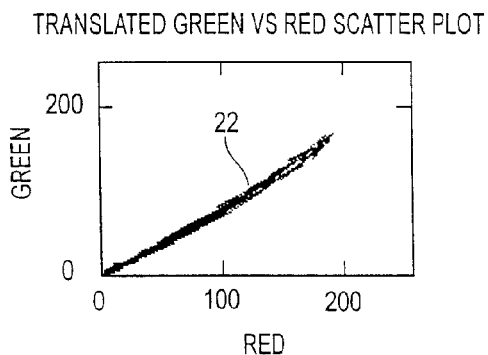
FIGS. 4A–4C are complemented color plots for FIGS. 3A–3C, wherein the pixel values are translated to extend from the origin (0,0) by subtraction of the actual values by an amount, such as 255, representing the maximum pixel value under the given quantization scheme for the image.
Figure 4B:
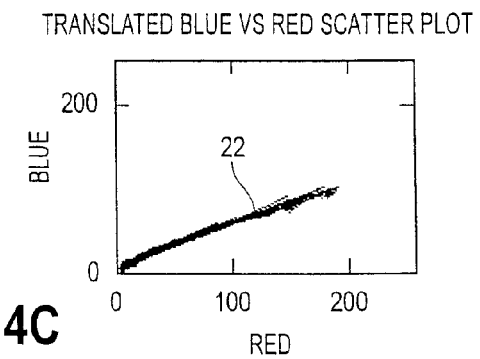
Figure 4C:
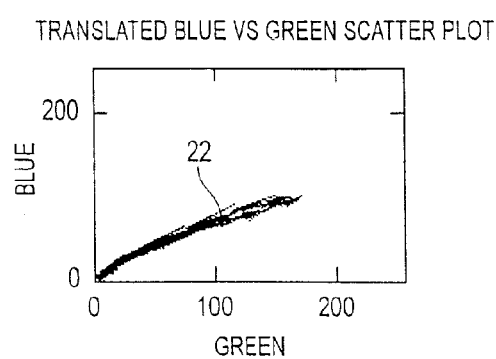
Figure 5A:
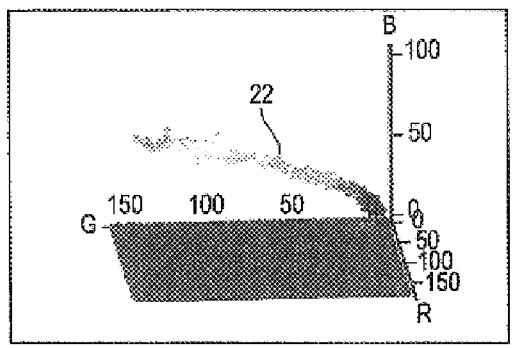
FIGS. 5A–5D are four views of a three-dimensional color cube having red, blue and green axes, in which the points of the scatter plots of FIGS. 4A–4C are combined into a single 3 dimensional color plot.
Figure 5B:
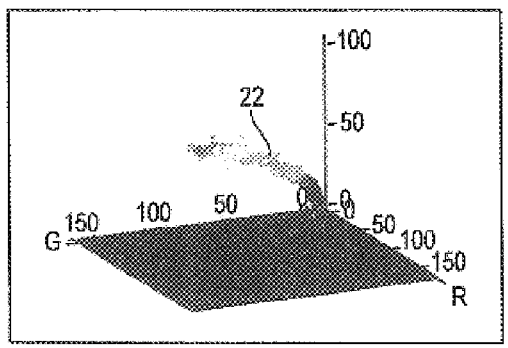
Figure 5C:
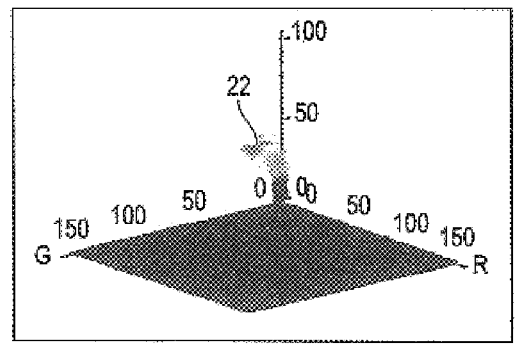
Figure 5D:
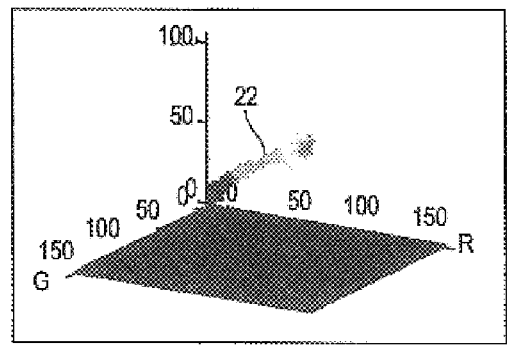

In order to subtract out the "clear" background, which contains little or no useful information, it is convenient to translate these color values such that the scatter plots extend from the origin (0,0) in two dimensions in a two dimensional plot, or the origin (0,0,0) in a three dimensional scatter plot, described below. That is, the methods described herein will take the compliment of each color value, by subtracting each color value from the maximum allowed, such as 255 for 8 bit pixels, and then re-plotting the complement values so that they extend from the origin. The plots 22 of complemented color values are shown in FIGS. 4A, 4B and 4C. These are the same data as before but complimented, or translated. As before, they illustrate a high degree of correlation, as indicated by the nearly linear form of the plots 22 in the figures.

The plots of FIGS. 4A, 4B and 4C can be combined to form a three-dimensional representation of the plot. The result is a "color cube", with the axes of the color cube being the red, blue and green axis corresponding to the 3 axes of a Cartesian coordinate system. Each pixel is plotted as a point as a function of its complemented red, blue and green color value. Viewing each pixel as a point in a three-dimensional space (as opposed to each pixel having three color components), the operation of subtracting the color value from the maximum allowed is equivalent to translating the origin of the coordinate system in three dimensions in order to subtract out the clear background. FIGS. 5A–5D show four views of a three-dimensional representation of the color components for a set of pixels from region 14 in FIG. 1 containing blue "normal" cells. The "z" or vertical axis is blue, the green axis is the "x" axis and the red axis is the "y" axis, using the Right Hand Rule. The representation in three dimensions provides additional illustration of the same correlation between the pixel color values as was illustrated in FIGS. 4A–4C. In particular, in FIGS. 5A–5D, one can clearly see the (nearly) linear relationship between the separate red, green, and blue values by virtue of the plot 22 falling, more or less, along a line extending in three dimensional color space, with the line terminating at the origin (0,0,0).

Again, what may be clearly seen in FIGS. 5A–5D is that only one number could be required to describe all three of the color components of a given pixel, at least to a close approximation. This number corresponds to the distance from the origin along the straight line passing through the cluster of points. This new value, or "color" is therefore only one dimensional in this space and does not require three separate numbers to characterize it, e.g. red, green, or blue. A color space transformation, comprising an appropriate coordinate translation (complementing the pixel values) and rotation of the coordinate system to align one of the three new axes along this cluster of pixels, would produce a new, and single value for each of the original pixels for objects stained with this color, thereby achieving significant compression, at least to a close approximation. This method, coded in software and executed by a general-purpose computer, could be used in any image in which an object of interest is in one color and where the rest of the image is clear or can otherwise be subtracted out.

The discussion of FIGS. 3–5 pertained to the counterstained "normal" cells in the region 14 of the example colors slide in FIG. 1. The method is useful generally where you have objects of interest of one color and a background that can be subtracted out. The preferred embodiment also provides compression techniques for images that contain both normal cells of one color as well as "abnormal" or "positive"

cells in a contrasting color, in addition to a clear background. This will now be described in conjunction with FIGS. 6–11.

Figure 6A:
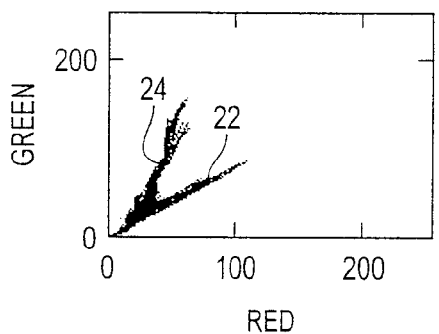
FIGS. 6A–6C are two-dimensional color plots for a portion of the image of FIG. 1 containing both the blue counterstained objects, the clear background, and the positive object in the center of the image, wherein the color value of a given pixel is plotted as a function of its color for two colors, as was the case in FIGS. 3A–3C.
Figure 6B:
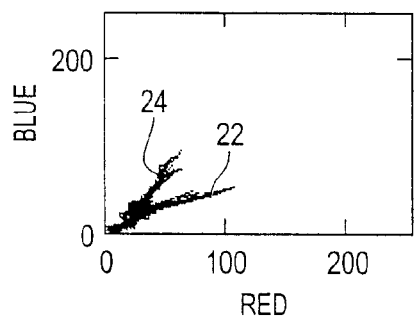
Figure 6C:
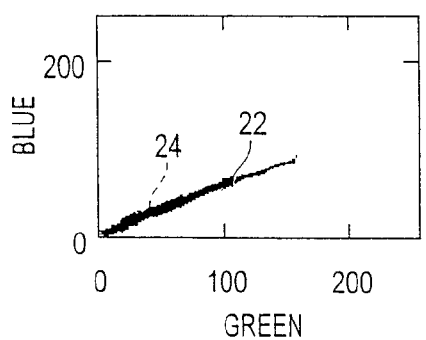

FIG. 6A–6C shows two dimensional color plots for the portion 16 of the original image of FIG. 1, in which the portion of the original image contains pixels for both counterstained objects and the positive object. The plots 22, 24 in FIGS. 6A–6C are like FIGS. 4A–4C, and are complements of the actual red, blue and green pixel values, obtained by subtracting the pixel values from the maximum value of 255 in an 8-bit system. Note that in FIG. 6A–6B an additional band 24 of pixels is evident in these scatter plots that corresponds to the red-stained pixels from the positive cell 12 in FIG. 1. The band 24 is essentially hidden amongst the other points in the plot 22 of FIG. 6C.

Figure 7A:
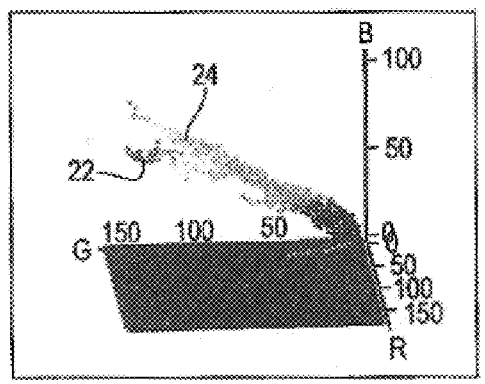
FIGS. 7A–7D are four views of a three-dimensional color cube having red, blue and green axes, in which the points of the scatter plots of FIGS. 6A–6C are combined into a single 3 dimensional color plot.
Figure 7B:
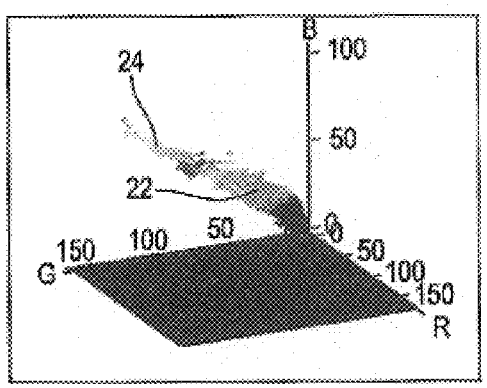
Figure 7C:
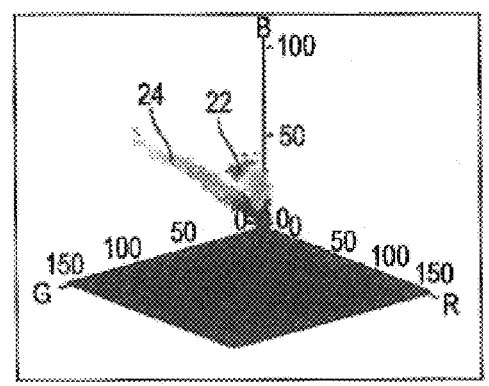
Figure 7D:
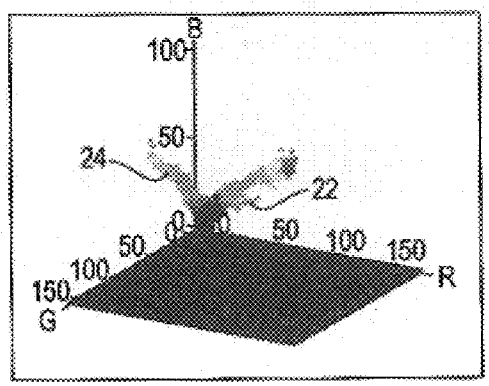

The plots of FIGS. 6A–6C can be combined into a three-dimensional representation, similar to that discussed above in conjunction with FIGS. 5A–5D. Four views of the three-dimensional representation of the plots 22, 24 of FIGS. 6A–6C are shown in FIG. 7A–7D. In FIGS. 7A–7D, the axes of the three-dimensional color cube are red, blue and green, as shown. The color cube of FIG. 7D shows the nearly linear plot of points 22 corresponding to the "normal" cells, as well as the nearly linear plot of points 24 corresponding to the "positive" object or abnormal cell.

Now, after performing the coordinate translation or complementing as already mentioned, a rotation of the coordinate axes is performed to provide spectral decorrelation but spatial redundancy. This translation and rotation of the axes is referred to herein as a color space transformation. In particular, a rotation of the coordinate axes is performed such that one new axis lies along the plot of points 24 corresponding to the positive object 12 (FIG. 1), and one other axis lies in the plane formed by the positive object plot of points 24 and the plot of points 22 corresponding to the counterstained objects or normal cells 10 (FIG. 1). As a result, one obtains three new axes, referred to herein as the A, B and C axes, each of which is a linear combination of the original red, green, and blue color components.

Alternatively, the rotation could be performed such that one new axis lies along the plot of points 22 corresponding to the counterstained objects, and one other axes lies in the plane formed by points 22 corresponding to the counterstained objects and the points 24 corresponding to the positive object. In either case, the result is three new axes, which are a linear combination of the original red, blue and green color axes or color components.

A detailed procedure for determining the rotation coefficients dictating the rotation of the red, green and blue axes to produce the A, B and C axes is described later on in this document.

The color values for the pixels in the new A, B, C coordinate system comprise values having A, B and C components, just as they did for red, blue and green components. More precisely, the color component of each pixel in the original image is transformed, as described herein, to values in the A, B and C coordinate system. It is possible to construct images of all the pixels in the image showing their A values, their B values and their C values. The pixel values along the A axis, or, alternatively, the A component of color for each pixel, is shown as Image A in FIG. 8. This image A corresponds to a mix of the original red and blue pixel values corresponding to the positive object and the counterstained objects. The pixel values along the B axis, or, alternatively, the B component of color for each pixel, are shown as Image B in FIG. 9. This image shows essentially only the positive object pixels of the original image. This is because the rotation of the red, blue and green coordinate system described above was performed such that the B axis lies, more or less, long the line of points 24 represented by the positive object. The pixel values along the C axis, or, alternatively, the C component of color for each pixel is shown as Image C in FIG. 10. Image C contains little-to-no new information. This is because the rotation described above was performed such that the A and B axes lie in a plane containing the points for both the positive objects and the counterstained objects. Very little information (points in the 3D plot of FIGS. 7A–7D) lies outside of this plane, i.e., orthogonal to the A and B axes. This results from the fact that the useful image information is essentially in two contrasting colors, and the translation and rotation is performed such that the points one of these colors, here the pixels representing the positive object, lies along one of the axes (here, the B axis) and the other of the two colors, here the pixels for the normal cells, lies in a plane containing the B axis and the A axis. Little or no useful additional color information exists in the orthogonal dimension, here, the C dimension.

Figure 8:
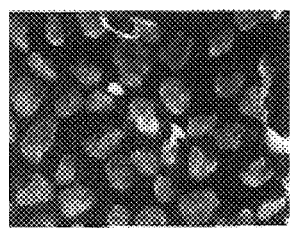
FIG. 8 is an image of the specimen with the values of each pixel along the "A" axis shown, with the A axis being a rotation of the red, blue and green axes of FIGS. 7A–7D in accordance with the rotational features described herein.
Figure 9:
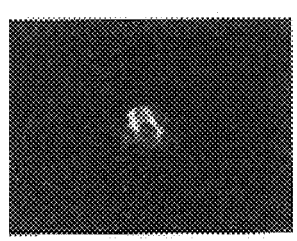
FIG. 9 is an image of the specimen with the values of each pixel in the "B" axis shown, with the B axis being a rotation of the red, blue and green axes of FIGS. 7A–7D in accordance with the rotational features described herein so as to be in alignment (more or less) with the band of points in FIG. 7A–7D corresponding to the positive object.
Figure 10:
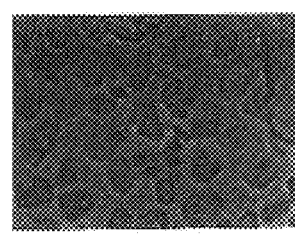
FIG. 10 is an image of the specimen with the values of each pixel in the "C" axis shown, with the C axis being a rotation of the red, blue and green axes of FIGS. 7A–7D in accordance with the rotational features described herein.
Figure 11A:
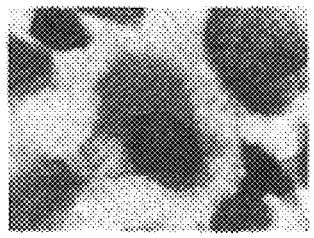
FIGS. 11A–11F shows 6 images, including an original uncompressed image and five images with varying degrees of compression according to techniques of this invention, with the images showing that the present invention does not result in any significant loss of image information, even when the maximum amount of compression is used.
Figure 11B:
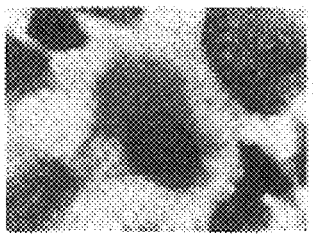
Figure 11C:
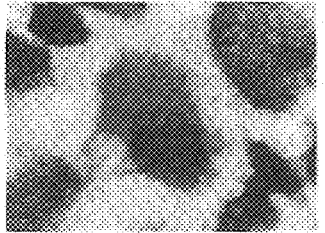
Figure 11D:
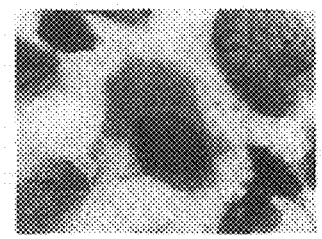
Figure 11E:
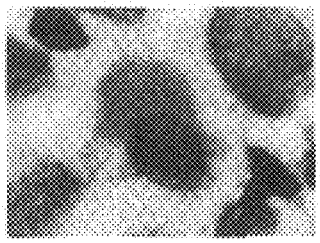
Figure 11F:
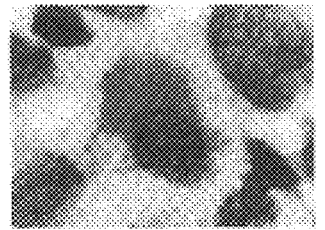

Thus, it can be seen in FIG. 9 that the pixels of the B image are specific to the original red (positive object) pixels only, and pixels of the C image (FIG. 10) contain little useful information of either the positive objects or the counterstained objects. Note however that considerable spatial redundancy is now present in both images A and B, that was not present in the original red, green, or blue images planes of FIG. 2A, 2B and 2C. In particular, there are broad areas in both FIG. 8 and FIG. 9, especially in FIG. 9 (the B image), containing only black or nearly black pixels. By subjecting these three new images to loss-less compression to remove spatial redundancy (such as by substitution, statistical or other methods), overall loss-less compression results for the color image, much more than would otherwise have occurred from application of the same compression method to the images of FIGS. 2A–2C. Similarly, these images could be compressed further by any other compression method including JPEG, or additional lossy techniques described below.

There is a similarity between this transformation and Principle Component (PC) transformations. There are several essential differences, however, between PC transformations and those described here. First, the translation of the coordinate system is not inherent in PC, but is essential to simultaneously provide spectral decorrelation and spatial redundancy, which are features of the preferred embodiment of the present inventive procedure. Secondly, a PC transformation computes rotation coefficients based on all color pixels (red and blue in this case) resulting in a lack of color specificity—i.e. the three resulting "colors" are all mixes of the original red, green, and blue. Lastly the PC transform calculates new rotation coefficients for each image whereas it need be done only once for this new method, thereby reducing computational requirements.

Further compression may be achieved by noting that the C image contains little useful or additional information. In one possible embodiment, image C (or, equivalently, the C component in the pixel values) is completely eliminated. In other words, the three dimensional rotation and translation is performed, but only the A and B pixel values are stored and transmitted. By eliminating the C image altogether and retaining only the A and B images, additional compression results without significant loss of image utility.

Still further compression may be obtained by noting that the black areas (i.e. the low pixel value areas) of the B image would be zero if the correlation between the original red, green, and blue pixels were completely linear. In other words, if the 3D plots of the positive object in 3D color space (red green and blue, after complementing) resulted in a perfectly straight line, the rotation of the red, green and blue axes could be performed such that the B axis would lie coincident with this line. However, as can be seen by the scatter plots of FIGS. 6 and 7, the line of points 24 for the positive object is not quite linear. The result of this is that there is a low level modulation of the black areas of the B image (FIG. 9) which contains little or no additional information that is not already present in the A image (FIG. 8). Therefore, the low-valued background (black) areas of the B image (pixels with B values less than a threshold such as 10 or 20) may be set to zero resulting in greater spatial redundancy and, accordingly, greater overall compression, albeit with some small amount of loss.

Furthermore, even greater lossy compression may be obtained by down sampling the A image (FIG. 8), the image primarily of the counterstained objects. Loss of image information for counterstained objects is assumed to be less objectionable in a cytology or pathology application than loss of image information for positive objects, as in the B image. However, either of these images could be down sampled depending on the sensitivity to errors.

In short, the compression methods described herein are configurable, allowing the user some control or options as to the extent to which compression is to occur and allowing the user to specify certain features for execution but not others. For example, the user may specify omitting of the "C" or orthogonal image, only retaining the A and B images. Alternatively, the user may specify more compression, and specify omitting the C image, setting all background areas in the B image to zero, and down sampling of the A image.

The magnitude of the resulting data errors depend on the exact correlation, or linearity, between the original red, green, and blue pixel values. In other words, the more that the scatter plots produce a linear relationship between the red, green and blue pixels for both the counterstained objects and the positive objects, the smaller the error. In the present example of FIGS. 6-9, the correlation between the original pixel values is close to linear. In one possible embodiment, they could forced to be linear by a pre and post-processing of the pixel values such as with a gamma modification. Gamma (analog) compression is one in which the value of a pixel is raised to an exponential power. For example, if one has a pixel value of v, calculate $K_1 v^{K2}$, where K2 can be a positive or negative number. For example, K2 may be equal to say 2. Then, chose a value of $K_1$ to rescale the result back to between 0 and the highest number available in the color quantization, e.g. 255 for 8-bit quantization. It is also possible to inverse this function by choosing K2 to be equal to 0.5. This technique can be used for example in the situation where, for whatever reason, the red pixels values are related to the green ones by the square root, or, in other words, red=sqrt (green). This is obviously a non-linear relationship between red and green pixel values. If we were to square the green pixel values before doing the color space transformation described herein, the relationship between the red and green pixel values would become linear, resulting in a linear plot of points and the color space transformation to produce the A, B and C axes as described herein can proceed. The value of K2 (here 0.5) is stored in the output file of FIG. 18. The operation can be reversed to recover the original data. In other words, after the inverse tranformation has been performed to uncover "red", "blue" and "green" color components, the square root is applied to the squared pixel values to uncover the actual values.

Additional pre and post processing can be performed to enhance the compression, and in particular enhance the linearity of the pixel values in the scatter plots. This type of pre-and post-processing is often referred to as "companding." However, even in the lack of such compansion the loss of image utility appears to be minimal. The amount of compression may be set by the user resulting in either loss less, or lossy compression by a combination of steps including elimination of the third C image altogether, to set black areas of the B image to zero, and/or by down sampling, or combinations of these steps. Examples of these are given in the following section.

Compression Test Results

The results of testing on several different combination of compression steps (cases) are given below. The chart shows the amount of data needed to represent the original image, using several different levels of compression using the techniques described herein. In the cases set forth in the chart the indicated steps were performed (Y) and the remaining data planes were post-compressed (loss less) utilizing WINZip (version 8.1). Other post-compression methods could be utilized on the resulting A, B (or C) images, with still greater compression, such as JPEG.

"Case 0" in the chart is without using any of the techniques described herein. Case 1 is a loss less compression since the translation and rotation of the color data to the new A, B, C coordinate space was performed without any linearization of the color data, and the translation and rotation does not loose any color information. Cases 2–5 are all lossy compression techniques due to the use of additional features to compress the data, which loses some data, however the loss of image data is not significant as shown in FIGS. 11A–11F.

|  | Original Image | Case 0 | Case 1 (Loss Less) | Case 2 | Case 3 | Case 4 | Case 5 |
|---|---|---|---|---|---|---|---|
| Color Transform | N | N | Y | Y | Y | Y | Y |
| Discard Image C | N | N | N | Y | Y | Y | Y |
| Set Image B Background to Zero | N | N | N | N | Y | Y | Y |
| Down Sample Image A, Vertical (2×) | N | N | N | N | N | Y | Y |
| Down Sample Image A, Horizontal (2×) | N | N | N | N | N | N | Y |
| WinZIP | N | Y | Y | Y | Y | Y | Y |
| File Size (Kbyte) | 955 | 788 | 631 | 405 | 316 | 176 | 143 |

Image quality for cases 0–5 will be appreciated from an inspection of FIGS. 11A–11F. Enlarged areas are shown for each compressed and reconstructed case. Compare the image with maximum compression (FIG. 11F, case 5, 143 Kbytes) with the original image, FIG. 11A, 788 Kbytes). The images are virtually indistinguishable, yet there is a 5.5:1 compression of the image data.

In summary, color microscope images (as well as other types) containing objects having two distinct colors, (such as having been stained with two distinct stains) may be processed to decorrelate the color bands. The required processing is a combination of coordinate translation and rotation. Once performed, the resulting three new "colors", or values are no longer correlated spectrally, but the resulting images do have a greater degree of spatial redundancy. This new set of three images can be then losslessly compressed to provide greater loss less compression than if the color transformation had not been performed. Additionally further processing, such as linearization of the data, companding, gamma modification, and/or elimination of some of these new values results in still greater compression. Strictly speaking, these later steps are lossy. Loss in image utility, however, would appear to be quite minimal, as indicated in the example of FIGS. 11A–11F.

Figure 16:
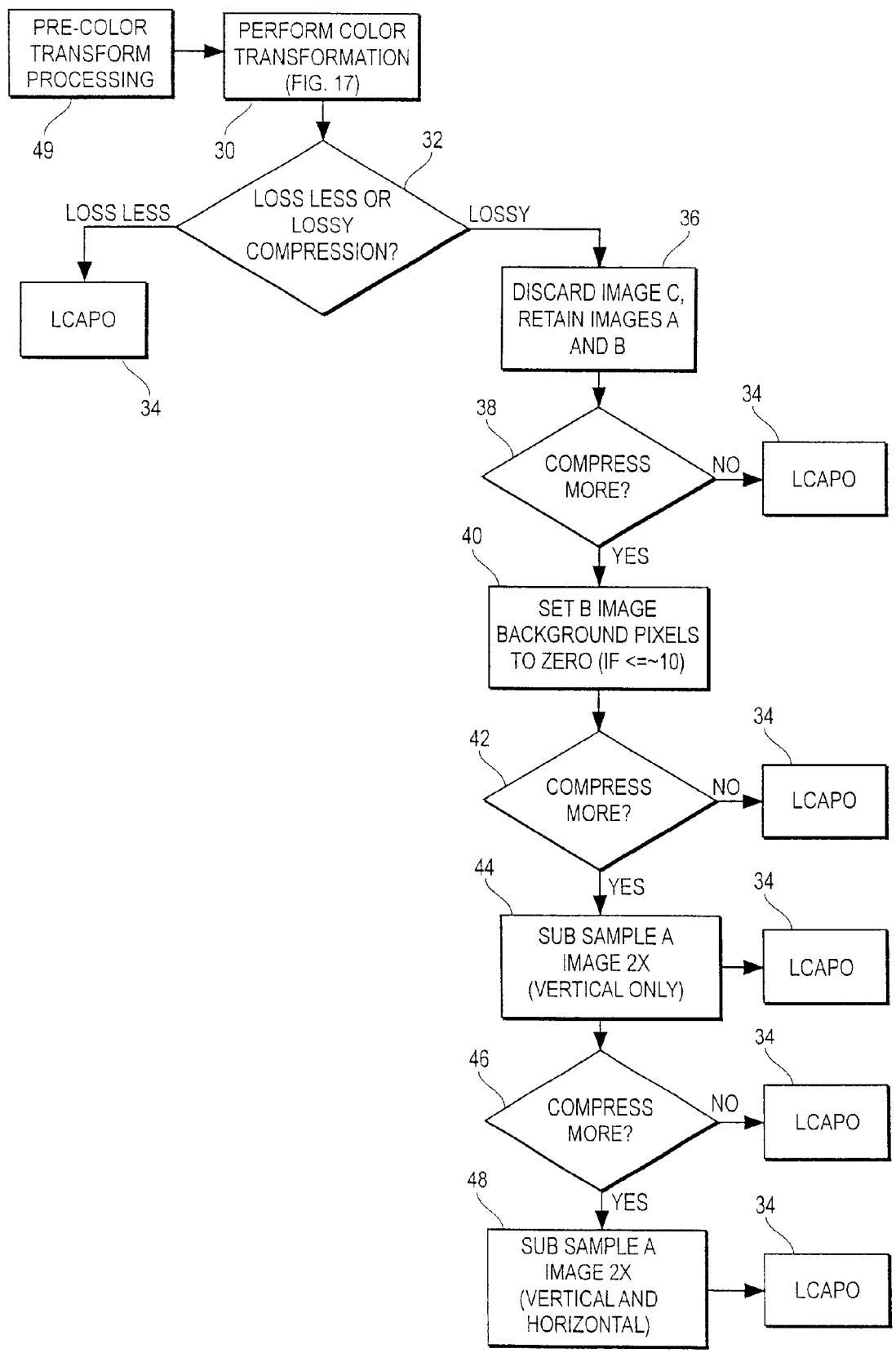
FIG. 16 is a flow chart showing the compression process in accordance with a presently preferred embodiment of the invention.
Figure 17:
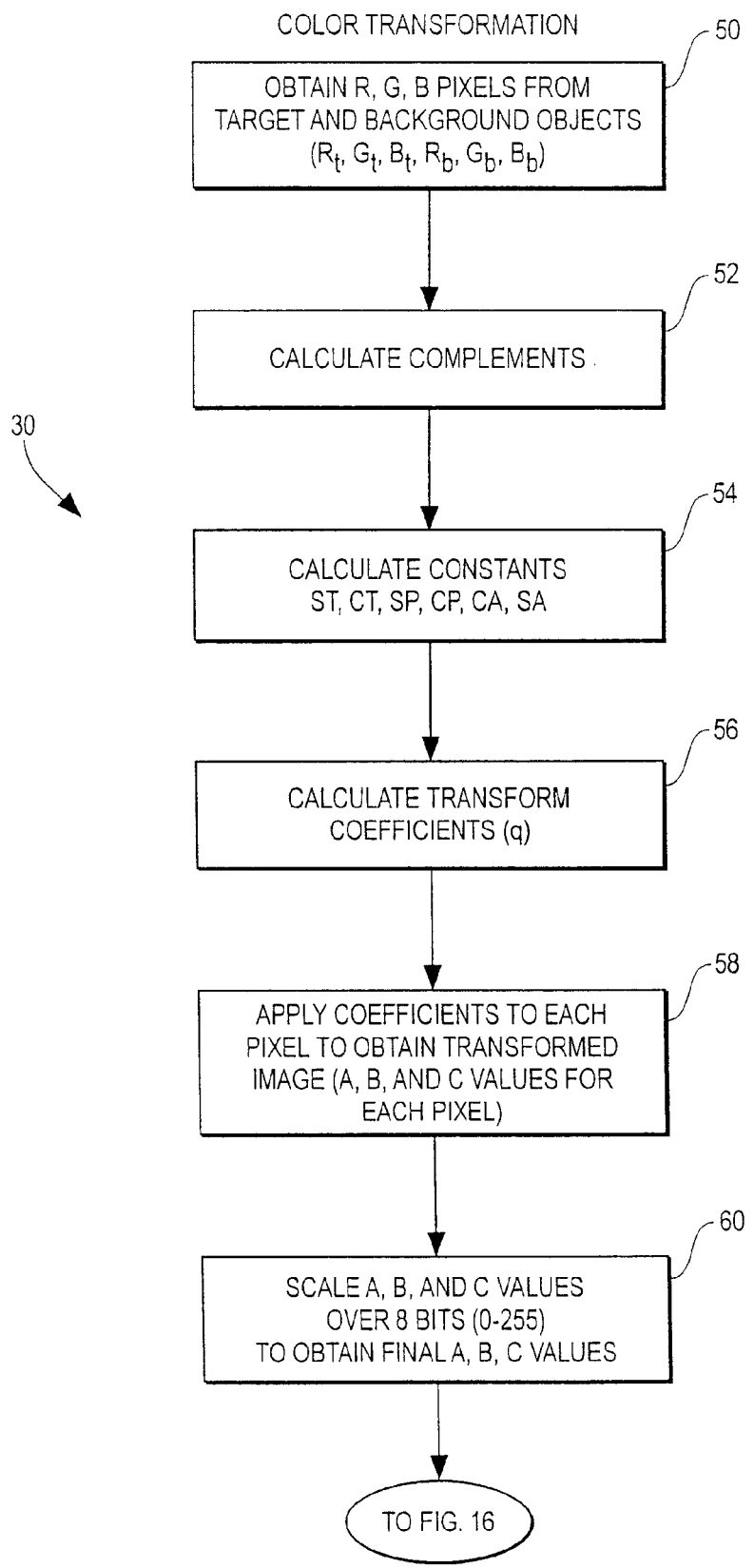
FIG. 17 is a flow chart of the "Perform Color Transformation" module of FIG. 16.

The procedure for performing the method shown in FIGS. 6–11 is shown in flow chart form in FIGS. 16 and 17. Referring to FIG. 16, a color space transformation at step 30 is performed on the input image to produce the A, B and C values for each pixel, or equivalently, the A, B and C images described above. Step 30 is shown in further detail in FIG. 17. After the color space transformation is performed, a decision is made as to whether lossless compression is performed or whether lossy compression is performed. This will be typically specified by the user, for example through a prompt on a user interface or by storage of a flag or bit indicating how the procedure is to execute. If loss less compression is selected, the process proceeds to a routine 34 wherein loss less compression and preparation of an output file is performed (abbreviated LCAPO). Routine 34 is explained in further detail in FIG. 18.

If some lossy compression is to be performed, the process branches to a series of lossy compression techniques, shown as blocks 36, 40, 44 and 48. These steps do not have to be performed in any particular order. In FIG. 16, block 36 further compresses the image by discarding the C image (or equivalently the C values) and retains the A and B values. A decision block 38 is executed wherein the process determines whether additional compression is to be performed. Again, block 38 may be executed by asking for user input via a prompt or by storing a flag or bit indicating whether further compression is to be performed. If no further compression is to be performed, the process proceeds to the loss less compression and output routine 34.

If further compression is to be performed, the process proceeds to step 40 wherein the process sets the background pixels of the B image to zero for all B values that are lower than a certain threshold, such at 10 or 20 in a 255 bit quantization scheme. With reference to FIG. 9, this is equivalent to setting the black background, which contains only shadowy objects representing the normal cells, to zero. This adds further spatial redundancy, enabling loss less compression techniques to substantially compress the image further. After step 40 executes, the process proceeds to a decision block 42, where a decision is made to further compress the image. As before, this could be via user prompt or by reference to a stored flag or bit indicating how the process is to proceed. If no further compression is performed, the process proceeds to routine 34.

If further compression is performed, the process proceeds to step 44 where a 2× subsampling of the A image in the vertical direction is performed to further compress the A image data (A values). This step effectively reduces the resolution in the vertical direction by up to 50 percent. However, the A image primarily depicts background objects which are of less interest, hence the loss of information may be acceptable in many embodiments. Once this step is performed, the process proceeds to decision block 46 where a decision is made as to whether to compress more. This can again be by user input or by reference to stored information on how the process is to execute. If no further lossy compression is to be performed the process proceeds to the routine 34.

If further compression is to be performed, the process proceeds to routine 48 where a 2× sub-sampling of the A image is performed in the horizontal direction. The result is sent to the output routine 34.

As shown in FIG. 16, additional processing could be performed on the raw red, green and blue pixel values to further compress the image, albeit with some loss of image information. This pre-color space transformation processing is shown as module 49. Examples of the process in step 49 include application of a gamma function or other linearization algorithm to the input data, which would result in more linear plots of background objects and positive objects in the color transformation at step 30, and hence the data lying in the plane containing the A and B axis and the positive objects lying more closely on the B axis.

FIG. 17 is a flow chart showing the color transformation step 30. The algorithm includes a first step 50 of obtaining the red, green and blue pixel values from both positive objects 12 (FIG. 1), Rt, Gt, Bt, or, more generally, target objects in the image, as well as for counterstained objects, or, more generally, background objects, Rb, Gb, Bb. These values are obtained after translation to the origin using the complementing procedure described herein. In a cellular image in which the specimen is stained, these values will typically be constant for a given stain or combination of stains. The effect of colorimetric mis-calibration in the image acquisition that acquires the imagery is also minor since the color transformation coefficients are saved with the output file. Colorimetric errors cause "errors", or changes in the transform coefficients, but reconstruction can still take place accurately.

The next step 52 is to calculate the complements of these values and move the points such that they extend from the origin, thereby subtracting out clear background. This is accomplished by subtraction of the pixel values from the highest number in the given quantization scheme that is used, such as 255 in an 8 bit quantization scheme.

The next step at step 54 is to calculate the rotational constants that dictate the θ, φ, and α rotations of the original R, B, G coordinate system. These constants are sine θ (st), cosine θ (ct), sine φ (sp), cosine φ (cp), sine α (sa) and cosine α (ca). They are as follows:

$$st := \frac{Gb}{(Rb^2 + Gb^2)^{0.5}} \qquad ct := \frac{Rb}{(Rb^2 + Gb^2)^{0.5}}$$

$$sp := \frac{(Rb^2 + Gb^2)^{0.5}}{(Rb^2 + Gb^2 + Bb^2)^{0.5}} \qquad cp := \frac{Bb}{(Rb^2 + Gb^2 + Bb^2)^{0.5}}$$

$$ca := \frac{[[-st \cdot (Rt) + ct \cdot Gt]]}{[[(-cp \cdot ct \cdot Rt) - cp \cdot st \cdot Gt + sp \cdot Bt]^2 + (-st \cdot Rt + ct \cdot Gt)^2]^{0.5}}$$

$$sa := \frac{(-cp \cdot ct \cdot Rt) - cp \cdot st \cdot Gt + sp \cdot Bt}{[[(-cp \cdot ct \cdot Rt) - cp \cdot st \cdot Gt + sp \cdot Bt]^2 + (-st \cdot Rt + ct \cdot Gt)^2]^{0.5}}$$

At step 56, these six constants can be represented equivalently as the following nine (9) transformation coefficients, three red, three green and three blue:

$$\text{Coeff\_r1} = ct*sp \quad \text{Coeff\_g1} = st*ca - ct*cp*sa \quad \text{Coeff\_b1} = st*sa + ct*cp*sa$$

$$\text{Coeff\_r2} = -st*sp \quad \text{Coeff\_g2} = ct*ca + st*cp*sa \quad \text{Coeff\_b2} = ct*ca - st*cp*sa$$

$$\text{Coeff\_r3} = -cp \quad \text{Coeff\_g3} = -sp*sa \quad \text{Coeff\_b3} = sp*ca$$

The derivation of these coefficients is explained below. Finally, at step 58, the 9 transform coefficients are applied to each pixel to produce the three transformed images, or more precisely, the A, B and C values for each pixel:

$A = \text{Coeff\_}r1*(255\text{-red}) + \text{Coeff\_}g1*(255\text{-green}) + \text{Coeff\_}b1*(255\text{-Blue})$ $B = \text{Coeff\_}r2*(255\text{-red}) + \text{Coeff\_}g2*(255\text{-green}) + \text{Coeff\_}b2*(255\text{-Blue})$  Eqn. (1)

$C = \text{Coeff\_}r3*(255\text{-red}) + \text{Coeff\_}g3*(255\text{-green}) + \text{Coeff\_}b3*(255\text{-Blue})$  Eqn.(1)

The A, B and C values may include negative numbers and non-integer values. Accordingly, at step 60, the A B and C values from equation (1) are integerized and scaled into the 8 bit quantization scheme to form A, B and C values between 0 and 255. These values are stored in memory for the computing device executing the method. From step 60, the process proceeds to the flow chart of FIG. 16 at step 32.

Figure 18:
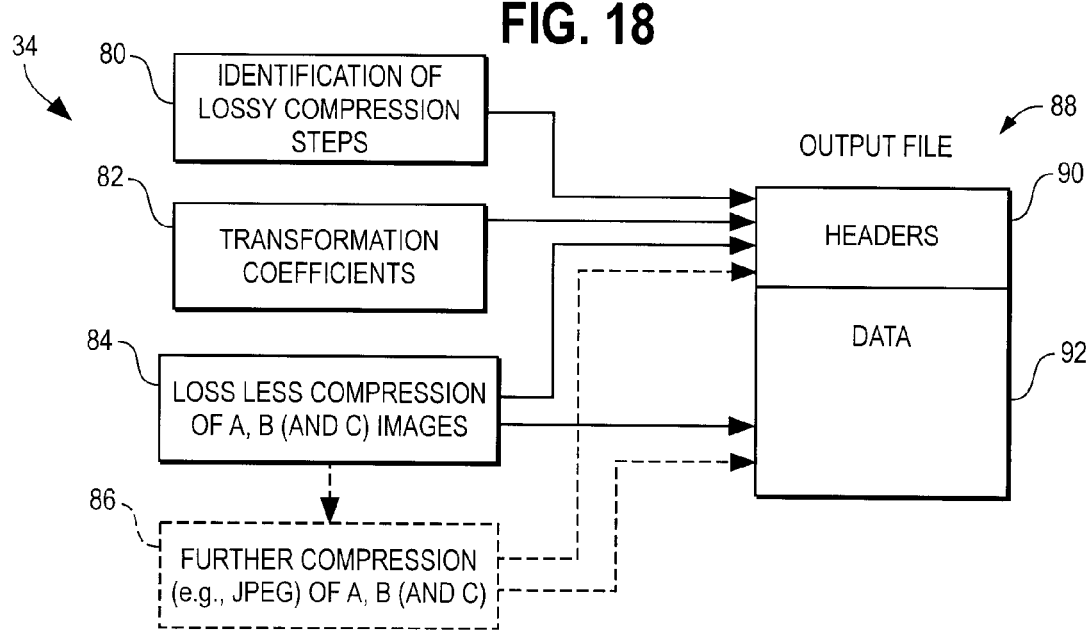
FIG. 18 is a diagram of the loss less compression and output module 34 of FIG. 16.

FIG. 18 shows the activities performed in software by loss less compression and preparation of output file routine 34 of FIG. 16. The routine 34 includes a module 80 which identifies the particular lossy compression steps 36, 40, 44, 48 that were performed in the routine FIG. 16, along with the values of any applicable constants or variables in the routines. Information as to these processes and variables or constants are stored in memory as an output file 88. This output file includes a field containing headers 90 that contain this information, as well as a field 92 containing raw image data. The routine 34 further includes a routine 82 that identifies the nine transformation coefficients coeffr_1, coeffr_2, etc., or, equivalently, the values sa, ca, st, ct, sp, cp, and the pixel values for the target and background images Rt, Gt, Bt, Rb, Gb, Bb. These values are further stored in the header field 90 of the output file. The output file would also store information identifying any companding algorithms, gamma modification, etc. that were performed and any applicable constants.

The routine 34 further includes a loss less compression algorithm or process that executes a known loss-less compression routine operating on the A and B images (A, B values) and optionally the C image (C values) depending on whether the C image was discarded or not. An example of this algorithm could be WINZip, LZW, or other loss less compression algorithm now known or later derived, the details are not particularly important. The output, compressed data, is stored in memory in the data field 92 of the output file. The type of compression used is stored in the header field 90.

Additional compression of the A, B and C images could be performed, as indicated in step 86. For example, after the loss less compression technique 84 is executed, the resulting A B and possible C image data could be subject to further compression algorithms, such as for example a lossy JPEG image compression algorithm. If the step 86 is performed, the data stored in the data field 92 would be the image data after execution of the lossy image compression algorithm in step 86, along with information in the header field 90 indicating the type of image compression and any other pertinent information needed to de-compress the image.

The output file 88 could be stored locally on the computer that executes the processes described herein. Alternatively, the output file could be transmitted over any suitable communications medium to another computer. Thus, the invention contemplates that compressed images, in the form of a file containing both raw image data and headers providing all the necessary information to decompress the image and construct the original image, could be transmitted over a computer network to a remote computer. The size of the data field 92 in the output file is substantially reduced from what it otherwise would have been had the compression not been performed. Thus, for a transmission channel of a given bandwidth, the file can be transmitted faster.

Figure 19:
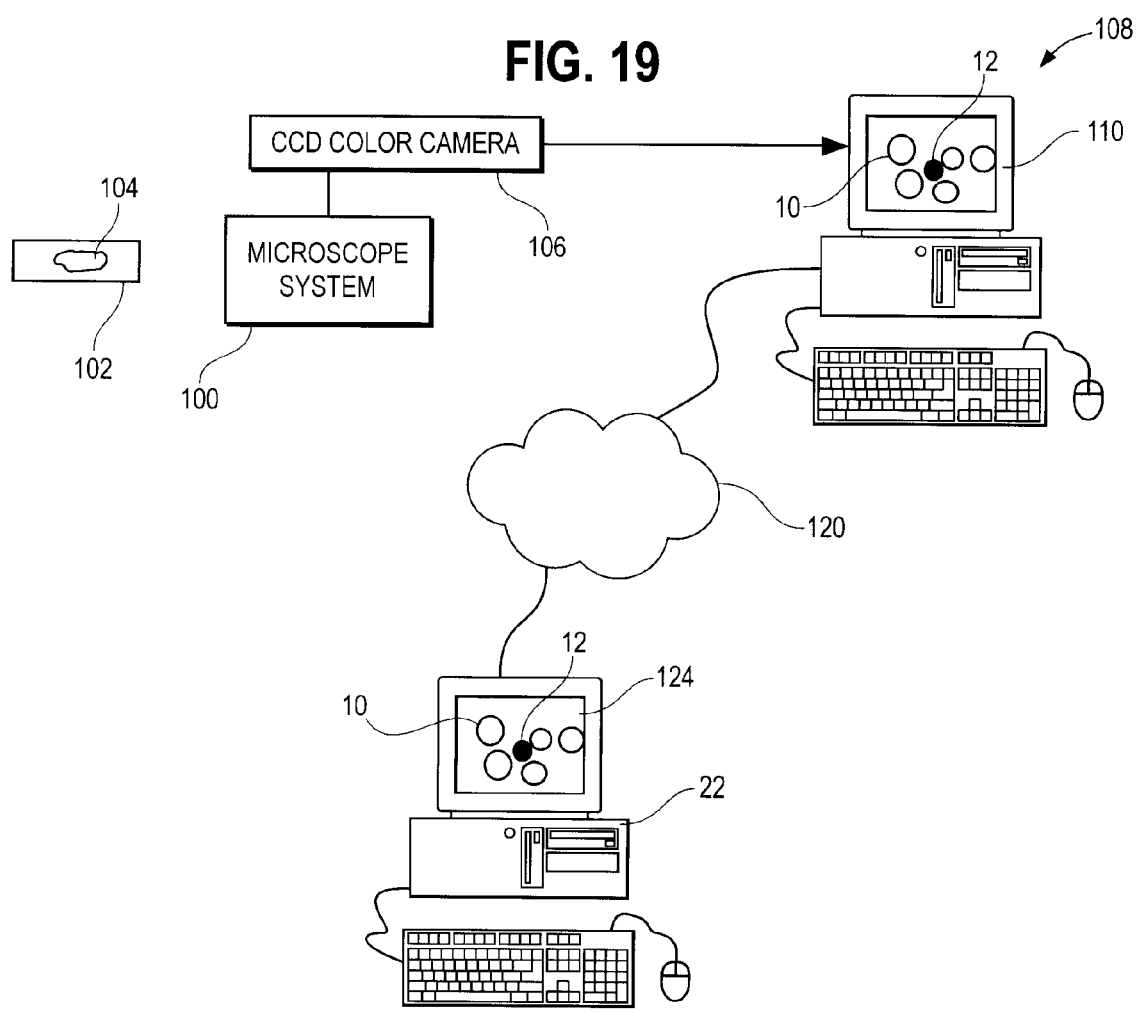
FIG. 19 is a schematic diagram of one possible hardware environment in which the invention may be practiced.

FIG. 19 thus shows an environment in which the invention can be practiced. The environment includes a microscope system 100 that receives a slide 102 containing a tissue sample 104. The sample 104 has been subject to one or more stains to make the objects on the slide more visible, such as described in conjunction with FIG. 1. The microscope system 100 is coupled to a color CCD camera 106 that obtains red, green and blue images of the slides at one or more magnification powers. The images from the camera 106 are provided to a general-purpose computer 108. The computer 108 may be a separate computer or may be integrated with and a part of the microscope system 100. The computer 108 includes a user interface 110 that displays the magnified color image of the specimen on the slide.

The computer 108 includes software instructions that identify background objects and positive objects using any of a variety of techniques, such as morphological processing or image processing of the color image. Alternatively, the user could highlight these areas with a mouse on the user interface 110 screen display. The user clicks on an icon to enter their instructions on how they wish to compress the image, basically selecting certain ones of the available lossy compression techniques that are described above. The user also may be prompted to identify the positive objects and the background object for purposes of obtaining the constants Rt, Gt, Bt, Rb, Gb, Bb. The user may also be prompted to enter whether any additional pre-color space transformation processes are to be used.

The computer 108 then executes the processes of FIGS. 16–18 and an output file is created. The output file can be stored in memory in the computer 108 or transmitted over a computer network 120 to a remote computer 122. The remote computer contains similar software as shown in FIGS. 16–18, and basically performs the inverse process on the output file 88 to reconstruct the original image. As shown in FIG. 19, the computer 122 includes a user interface 124 where the user can view the original slide image. The computer 122 can store the image locally or share it with other computers. As was demonstrated in FIG. 11, the resulting image of the specimen loses little or now useful information, despite compression of 5.5:1 or more.

The computer 108 could be incorporated into the system that generates the image (such as the microscope computer control system) or, alternatively could be a stand-alone device coupled to it over a local area network or other network. A general-purpose computer running a Windows TM operating system and having software for performing the tasks and routines described herein is one possible embodiment.

Figure 12:
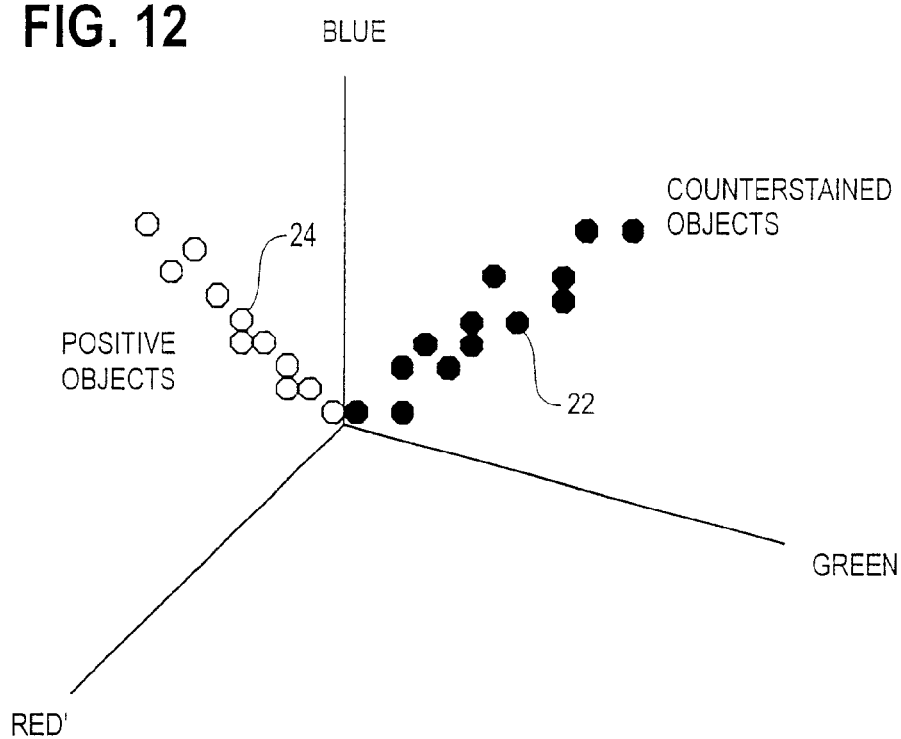
FIG. 12 is a representation of a plot of points representing color data for a group of pixels that include both counterstained objects (background cells or objects) and positive objects comprising objects of greater interest than the background objects.

As noted above, the rotation of the coordinate axes to produce the new A, B and C axes can be performed such that one axes lies along the plot of points corresponding to the counterstained object, rather than plot of points corresponding to the positive object. This will be shown in FIGS. 12–15. FIG. 12 depicts a three-dimensional scatter plot of pixels from an image. For each pixel, a point is plotted utilizing the red, green, and blue components as coordinates in a color space, or color cube. The values for red, green, and blue have been complimented, or subtracted from the maximum value possible such as 255 for a 24 bit color image (8 bits per color channel per pixel, three color channels). This translation shifts the pixel values for the background, which is normally the maximum value of 255, to zero. Two clusters of points may be seen. In FIG. 12, the plot of points 22 corresponds to the counterstained objects and the plot 24 corresponds to the positive objects. The red, green and blue axes are give a prime symbol in FIG. 12 to show that that the translation of the origin of the coordinate system has occurred and a subtraction of the actual pixel values from the maximum of 255 in an 8 bit quantization system has occurred. The clear background pixels, which now are clustered at the origin of this plot, are not shown for clarity. The counterstained object points 22 tend to lie along a straight line, as do the positive object points 24. These two lines of points define a plane in this space. Let us call this plane the "neutral" plane.

Figure 13:
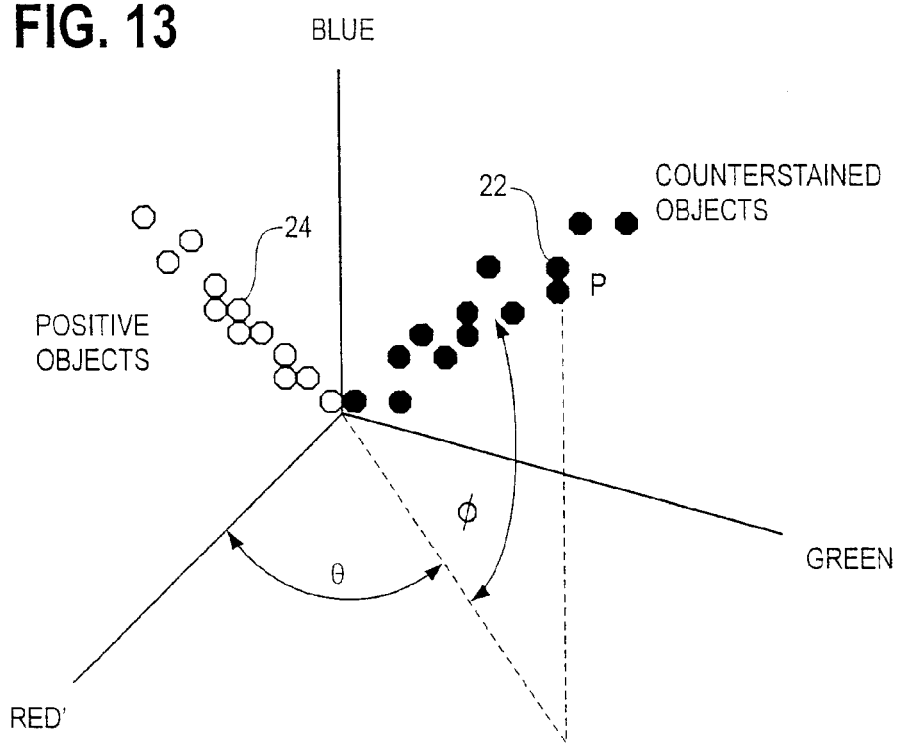
FIG. 13 is a drawing showing the plot of points of FIG. 12, showing the rotation about the blue axis about an angle θ as a first step in performing the rotations required by the color space transformation described herein.
Figure 14A:
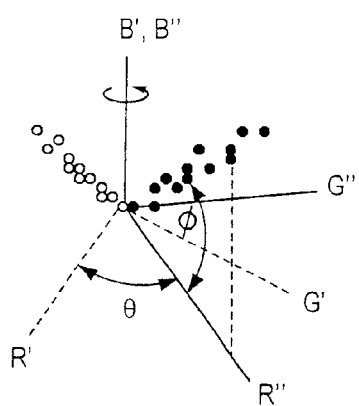
FIG. 14A, 14B and 14C show the three sequential rotations θ, ω, α that comprise the rotational aspects of the present color space transformation described herein.
Figure 14B:
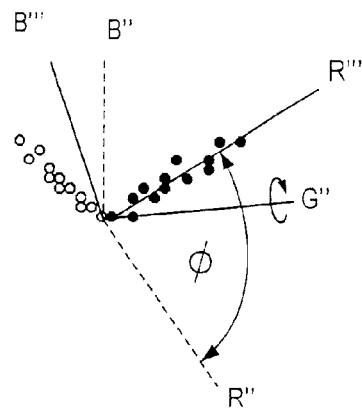
Figure 14C:
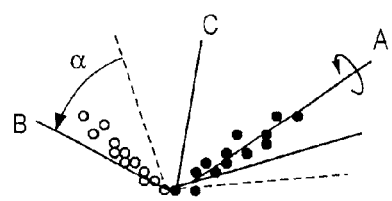
Figure 15:
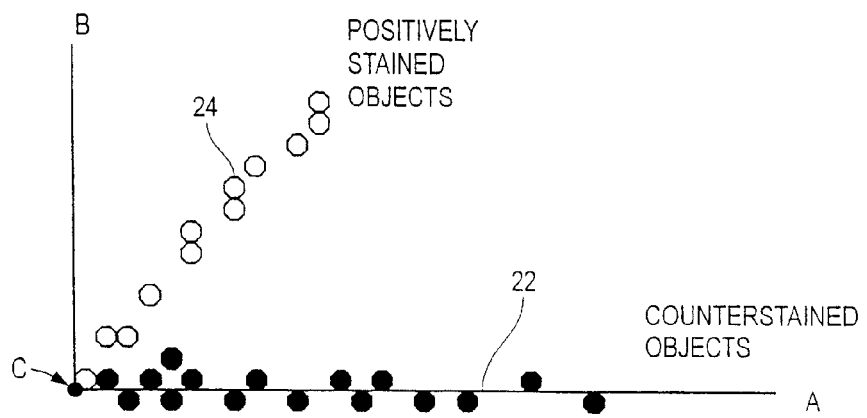
FIG. 15 shows the plot of points from FIG. 12 after the rotations described in FIG. 14 have been performed. Note that the plot of points lie in a plane containing the A and B axes of the transformed color space.

The purpose of the color space transformation described here is to rotate the R', G' B' coordinate system such that one new axis lies along the straight line formed by the counterstained objects, and a second new axis is taken with the first one forming a plane lying in the neutral plane. (Alternatively, the rotation could be done so that one axis lies along the line formed by the positive objects) To illustrate this, see FIG. 13. The rotation will be performed in three steps. The first of these will form a new and intermediate axis lying directly under the point P by rotation through the angle θ. The second will rotate this intermediate axis upward through angle φ to produce a second intermediate axis passing through point P (as well as all the other counterstained pixels). A third and final rotation is performed through angle α to produce the A, B, and C axes in which both the positive and counterstained objects lie completely within the A, B plane. These three rotations are illustrated in FIGS. 14A, 14B and 14C. When completed, all of the positive and counterstained pixels will lie entirely in the A, B plane (see FIG. 15) and will have zero (or very small) values in the C plane. The result is shown in FIG. 15. The C axis extends into the plane of the page in FIG. 15.

One can now produce three new images, an A image comprising the A values for each pixel, a B image comprising the B values for each pixel, and a C image comprising the C values for each pixel. In the A image, for example, for each pixel the pixel brightness would be determined by the A value. The B and C images would be produced in the same way. As can be seen from the plot in FIG. 15, in the B image, the pixel values (the B values) for counterstained objects would be zero, or nearly so. Only the positive stained pixels would produce appreciable brightness. In such an image, only the positively stained objects would be visible. The A image would contain appreciable pixel values for both positive and counterstained objects, since both plots 22 and 24 have substantial non-zero values along the A axis. The C image would be essentially zero valued everywhere since the plots of points 22 and 24 lie essentially in a plane.

Derivation of Transform Coefficients

As previously mentioned, the transformation process includes a step 52 which calculates the complement of all pixel values, i.e. to subtract their values from 255. Here, I refer to the intermediate axes utilized in the overall transformation as primed versions of the previous axes, that is R, G, and B for the original red, green, and blue axes is replaced with R-prime, G-prime, and B-prime as shown in FIGS. 12 and 13. This first translation step 52 would then be written in software, for each pixel:

R'=255-R
G'=255-G
B'=255-B

This step is the complementing of the actual pixel values by subtraction from the maximum value in the quantization scheme.

Following this translation, a rotation through the angle θ is performed about the B' axis, shown in FIG. 13 and FIG. 14A, so that the point P is directly above the R" axis as shown in FIGS. 13 and 14A. This produces new axes R", G" and B". The rotation is given by:

$$\begin{pmatrix} R'' \\ G'' \\ B'' \end{pmatrix} = \begin{pmatrix} ct & st & 0 \\ -st & ct & 0 \\ 0 & 0 & 1 \end{pmatrix} \begin{pmatrix} R' \\ G' \\ B' \end{pmatrix}$$

The matrix components are sins and cosines of the required rotation angle (θ). These are given by inspection from FIG. 1 as:

$$st := \frac{Gb}{(Rb^2 + Gb^2)^{0.5}} \quad ct := \frac{Rb}{(Rb^2 + Gb^2)^{0.5}}$$

Here the subscript "b" denotes counterstained pixel values, with Gb indicating the green values for a pixel depicting a counterstained object and Rb indicating the red value for a pixel depicting a counterstained object. One obtains these values from a "typical" pixel from a counterstained object. These values could be averages of several pixels, or averages for counterstained pixels over several slides of tissues stained with the same stain. These values are preferably constants that are stored in the software and used in the color space transformation algorithm described herein.

The second rotation is about the G" axis and yields new axes R''', G''' and B'''. This rotation is given by:

$$\begin{pmatrix} R''' \\ G''' \\ B''' \end{pmatrix} = \begin{pmatrix} sp & 0 & cp \\ 0 & 1 & 0 \\ -cp & 0 & sp \end{pmatrix} \begin{pmatrix} R'' \\ G'' \\ B'' \end{pmatrix}$$

Here, the rotation coefficients are sins and cosines of an angle φ and are given by:

$$sp := \frac{(Rb^2 + Gb^2)^{0.5}}{(Rb^2 + Gb^2 + Bb^2)^{0.5}} \quad cp := \frac{Bb}{(Rb^2 + Gb^2 + Bb^2)^{0.5}}$$

The Rb, Gb, and Bb values are as described above.

The final rotation is about the R''' axis to produce the new A, B and C axes, and produces the final new rotated color values, or:

$$\begin{pmatrix} A \\ B \\ C \end{pmatrix} = \begin{pmatrix} 1 & 0 & 0 \\ 0 & ca & -sa \\ 0 & sa & ca \end{pmatrix} \begin{pmatrix} R''' \\ G''' \\ B''' \end{pmatrix}$$

Here the rotation coefficients are the sins and cosines of an angle α shown in FIG. 14C and are given by:

$$ca := \frac{[[-st \cdot (Rt) + ct \cdot Gt]]}{[[(-cp \cdot ct \cdot Rt) - cp \cdot st \cdot Gt + sp \cdot Bt]^2 + (-st \cdot Rt + ct \cdot Gt)^2]^{0.5}}$$

$$sa := \frac{(-cp \cdot ct \cdot Rt) - cp \cdot st \cdot Gt + sp \cdot Bt}{[[(-cp \cdot ct \cdot Rt) - cp \cdot st \cdot Gt + sp \cdot Bt]^2 + (-st \cdot Rt + ct \cdot Gt)^2]^{0.5}}$$

Here, the subscript "t" represents pixel values for Red, Green and Blue for a positive object. These values of Rt, Gt and Bt are obtained in the same manner as for the counter-stained ones, that is, from a single pixel representing a positive object on a single slide, an average of multiple pixels representing a positive object on a single slide, or an average of pixel values for positive objects from a series of slides.

It is possible to combine these three rotations using linear algebra to produce one overall rotation matrix, which is given as:

$$\begin{pmatrix} 1 & 0 & 0 \\ 0 & ca & sa \\ 0 & -sa & ca \end{pmatrix} \cdot \begin{pmatrix} sp & 0 & cp \\ 0 & 1 & 0 \\ -cp & 0 & sp \end{pmatrix} \cdot \begin{pmatrix} ct & st & 0 \\ -st & ct & 0 \\ 0 & 0 & 1 \end{pmatrix} \rightarrow$$

$$\begin{pmatrix} sp \cdot ct & sp \cdot st & cp \\ -sa \cdot cp \cdot ct - ca \cdot st & -sa \cdot cp \cdot st + ca \cdot ct & sa \cdot sp \\ -ca \cdot cp \cdot ct + sa \cdot st & -ca \cdot cp \cdot st - sa \cdot ct & ca \cdot sp \end{pmatrix}$$

In other words, the A, B, and C values for each of the original r, g, and b values are given by equation 1 set forth above.

Thus, in a preferred implementation, a general purpose computer is provided with software in the form of machine-readable instructions that codes the equations for A, B and C (generates A, B and C values for each pixel) in terms of inputs comprising the red green and blue color values for each pixel, the constants associated with the θ, φ and α rotation angles: sa, ca, sp, cp, st, ct, the values Rb, Gb, and Bb, and the values Rt, Gt, and Bt. The nine transformation coefficients may be calculated from these values as explained above. The transformation coefficients are then stored in memory or output to a file. Lossless compression is performed on the resulting A, B and C values, which reduces the amount of information needed to represent the input image due to spatial redundancy. Additional lossy compression may occur by elimination of the C image, downsampling the A or B images, linearization of the input data, and other methods as described herein.

From the forgoing description, persons skilled in the art may vary somewhat from the presently preferred implementation of the invention without departure from the true scope of the invention. For example, while the presently preferred embodiment is in the context of medical images, the methods and apparatus described herein could be applied to other types of images. The objects of interest do not necessarily have to be cellular objects. Furthermore, other lossy compression techniques could be performed on the transformed image without departure from the scope of the invention. Other loss-less compress techniques could be used as well.

This scope of the invention is to be determined by reference to the appended claims, in view of the foregoing.

What is claimed is:

1. A method for compressing an image of an object, said image composed of a plurality of pixels including color data for pixels representing said object, comprising the steps of:
    a) receiving said image, said color data for said pixels representing said object having an approximately linear form if plotted as a function of red, green and blue color components of said color data;
    b) calculating new color values for said pixels based on the coordinates of said pixels in a transformed three-dimensional color space, said transformed color space having an axis coinciding, at least approximately, to said approximately linear form;
    c) performing a compression process on said new color values to thereby produce output image data in which spatial redundancy in said image is eliminated or reduced based on the new color values for said pixels in the transformed color space.

2. The method of claim 1, wherein said image comprises both background objects and objects of interest, and wherein said color data for pixels representing said background objects and objects of interest, if plotted as a function of red, blue and green color components, forming first and second approximately linear forms; and
    wherein step b) further comprises the step of calculating new color values for said pixels representing said background objects and said objects of interest based on the coordinates of said pixels in said transformed three-dimensional color space, said transformed color space being such that one of the three axes of said transformed three-dimensional color space is aligned with one of said first or second approximately linear forms, and one of the other two of said three axes in said transformed three-dimensional color space is in a plane containing, at least approximately, the other of said first linear form or said second linear form.

3. The method of claim 2, wherein a first axis of said transformed three-dimensional color space is aligned with said first linear form, a second axis is in a plane containing said first linear form and said second linear form and the third axis is orthogonal to said first and second axes, and wherein pixel values corresponding to said third axis of said transformed three-dimensional color space are discarded to further reduce the amount of data needed to represent said image.

4. The method of claim 1, further comprising the step of discarding pixel values for said object along one axis in said transformed three-dimensional color space to thereby further reduce the amount of data needed to represent said image.

5. The method of claim 1, wherein said transformed three-dimensional color space comprises a translation and rotation of a color space defined by the red, green, and blue colors.

6. The method of claim 5, wherein said translation comprises forming a complement of said color data to thereby translate the origin of said color space.

7. The method of claim 1, further comprising the step of performing an additional image compression algorithm on said output image data.

8. The method of claim 1, wherein said image comprises an image of a biological specimen.

9. The method of claim 8, wherein said biological specimen has been subject to at least one stain to thereby highlight said object and distinguish it from background objects.

10. The method of claim 8, wherein said biological specimen comprises a tissue specimen, and wherein said tissue specimen has been subject to at least two stains to thereby highlight both cellular objects and positive objects.

11. The method of claim 8, wherein said image comprises a magnified image of said biological specimen.

12. A machine for compressing an image of an object, said image composed of a plurality of pixels, comprising:
- a memory storing color data for pixels representing said object, said color data for said pixels representing said object having an approximately linear form if plotted as a function of red, green and blue color components of said color data;
- a processing unit having a set of instructions, said instructions including instructions for
- i) calculating new color values for said pixels based on the coordinates of said pixels in a transformed three-dimensional color space, said color space having an axis coinciding, at least approximately, to said approximately linear form; and
- iii) performing a compression algorithm on said new color values to eliminate spatial redundancy in said image based on the new color values in the transformed color space, to thereby reduce the amount of data needed to represent the image.

13. The machine of claim 12, wherein said machine comprises a computer system, and wherein said computer system is coupled to a microscope acquiring said image.

14. The machine of claims 12, wherein said image comprises an image of a biological specimen.

15. The machine of claim 14, wherein said biological specimen has been subject to at least one stain to thereby highlight said object and distinguish it from background objects.

16. The machine of claim 14, wherein said biological specimen comprises a tissue specimen, and wherein said tissue specimen has been subject to at least two stains to thereby highlight both cellular objects and positive objects.

17. The machine of claim 12, further comprising a microscope and a camera coupled to said microscope for acquiring said image and supplying said image to said memory.

18. The machine of claim 12, wherein said image comprises both background objects an object of interest, and wherein said color data for pixels representing said background objects and an object of interest forming first and second approximately linear forms; and
- wherein said instructions further comprise instructions calculating new color values for said pixels representing said background objects and said objects of interest based on the coordinates of said pixels in said transformed three-dimensional color space, said transformed three-dimensional color space being such that one of the three axes of said transformed three-dimensional color space is aligned with one of said first or second approximately linear forms, and one of the other two of said three axes in said transformed three-dimensional color space is in a plane containing, at least approximately, the other of said first linear form or said second linear form.

19. The machine of claim 18, wherein a first axis of said transformed three-dimensional color space is aligned with said first linear form, a second axis is in a plane containing said first linear form and said second linear form and the third axis is orthogonal to said first and second axes, and wherein said instruction further comprise instructions in which pixel values corresponding to said third axis of said transformed three-dimensional color space are discarded to further reduce the amount of data needed to represent said image.

20. The machine of claim 19, further comprising instructions for performing an additional image compression algorithm on said output image data.

21. The machine of claim 12, wherein said instructions further comprise instructions for discarding pixel values along one axis in said transformed three-dimensional color space to thereby further reduce the amount of data needed to represent said image.

22. The machine of claim 12, wherein said instructions further comprise instructions providing an output file comprising a header field containing one or more headers storing data representing transform coefficients and any lossy compression techniques applied to said new color values, and a data field comprising compressed image data.

23. A method of compressing a color image, said color image comprising color data for a plurality of pixels, comprising the steps of:
- a) obtaining red, green and blue pixel values of a target object in said image;
- b) obtaining red, green and blue pixel values for a background object in said image;
- c) calculating complements of said red, green and blue values of said target and background objects;
- d) calculating transformation coefficients for transforming said complements of said red, green and blue values of said target and background objects;
- e) applying the transformation coefficients to pixels in said image to thereby obtain a transformed data set representing said image having components along three mutually orthogonal axes in a three-dimensional transformed color space;
- f) scaling said transformed data set for each pixel in said image;
- g) applying a compression algorithm to at least two components of said transformed data set to thereby produce output data;
- h) storing said output data in a memory.

24. The method of claim 23, wherein said compression algorithm comprises a loss less compression algorithm.

25. The method of claim 24, further comprising the steps of transporting said output data and information associated with said transformation coefficients over a computer network to a remote computer.

26. The method of claim 23, further comprising the step of discarding one of the three components in said transformed data set and performing the compression step (g) after the discarding.

27. The method of claim 23, further comprising the step of setting values in one of the components in the transformed data set that are below a predetermined threshold to zero.

28. The method of claim 23, further comprising the step of sub-sampling one of the components in the transformed data set.

29. The method of claim 23, further comprising the step i) of performing an additional compression process after performing the compression process of step g).

30. The method of claim 29, wherein the compression process of step g) comprises a loss less compression and wherein step i) comprises performing a lossy compression.

31. The method of claim 23, further comprising the step of performing a linearization process on said pixel values for said target objects and said background objects and performing steps c)–g) thereafter.

32. The method of claim 23, wherein said image comprises an image of a biological specimen.

33. A computing platform for a microscope comprising software instructions coding the method of claim 32.

34. The method of claim 23, further comprising the step of prompting a user to select one or more lossy compression techniques to apply to said transformed data set, receiving a selection from the user, performing one or more lossy compression techniques selected by the user, and then subsequently applying said compression algorithm in step (g).

35. A method of compressing a color image, said color image comprising color data for a plurality of pixels, comprising the steps of:
   a) obtaining red, green and blue pixel values of an object of interest in said image;
   b) calculating complements of said red, green and blue values of said object of interest;
   c) calculating transformation coefficients for transforming said complements of said red, green and blue values of said object of interest;
   d) applying the transformation coefficients to pixels in said image to thereby obtain a transformed data set representing said image having components along three mutually orthogonal axes in a three-dimensional transformed color space;
   e) scaling said transformed data set for each pixel in said image;
   f) applying a compression algorithm to at least two components of said transformed data set to thereby produce output data; and
   g) storing said output data in a memory.

36. The method of claim 35, wherein said compression algorithm comprises a loss less compression algorithm.

37. The method of claim 35, further comprising the step of discarding one of the three components in said transformed data set and performing the compression step (f) after the discarding.

38. The method of claim 35, further comprising the step of setting values in one of the components in the transformed data set that are below a predetermined threshold to zero.

39. The method of claim 35, further comprising the step of sub-sampling values in one of the components in the transformed data set.

40. The method of claim 35, further comprising the step g) of performing and additional compression process after performing the compression process of step f).

41. The method of claim 40, wherein the compression process of step f) comprises a loss less compression and wherein step g) comprises performing a lossy compression.

42. The method of claim 35, further comprising the step of performing a linearization process on said pixel values for said objects of interest and performing steps b)–f) thereafter.

43. The method of claim 35, wherein said image comprises an image of a biological specimen.

44. A computing platform for a microscope comprising software instructions coding the method of claim 43.

45. The method of claim 35, further comprising the steps of transporting said output data and information associated with said transformation coefficients over a computer network to a remote computer.

46. The method of claim 35, further comprising the step of prompting a user to select one or more lossy compression techniques to apply to said transformed data set, receiving a selection from the user, performing one or more lossy compression techniques selected by the user, and then subsequently applying said compression algorithm in step (f).

* * * * *